United States Patent [19]

Choe

[11] 4,312,976

[45] Jan. 26, 1982

[54] SINGLE-STAGE MELT POLYMERIZATION PROCESS FOR THE PRODUCTION OF HIGH MOLECULAR WEIGHT POLYBENZIMIDAZOLE

[75] Inventor: Eui W. Choe, Randolph, N.J.

[73] Assignee: Celanese Corporation, New York, N.Y.

[21] Appl. No.: 169,052

[22] Filed: Jul. 15, 1980

[51] Int. Cl.³ .............................................. C08G 73/18
[52] U.S. Cl. .................................... 528/179; 528/184; 528/186; 528/312; 528/313; 528/318; 528/331; 528/336; 528/342
[58] Field of Search ............... 528/179, 184, 186, 312, 528/313, 318, 331, 336, 342

[56] References Cited

U.S. PATENT DOCUMENTS

| Re. 26,065 | 7/1966 | Marvel et al. | 260/29.1 R |
|---|---|---|---|
| 3,313,783 | 4/1967 | Iwakura et al. | 528/341 |
| 3,433,772 | 3/1969 | Chenevey et al. | 528/341 |
| 3,509,108 | 4/1970 | Prince | 528/341 |
| 3,551,389 | 12/1970 | Prince | 528/186 |
| 3,642,720 | 2/1972 | Kray et al. | 528/313 |
| 3,655,632 | 4/1972 | Ohfuji et al. | 528/362 |
| 3,708,439 | 1/1973 | Sayigh et al. | 528/342 |
| 4,154,919 | 5/1979 | Sheratte | 528/331 |

*Primary Examiner*—Maurice J. Welsh
*Attorney, Agent, or Firm*—Charles B. Barris

[57] ABSTRACT

A single-stage melt polymerization process for the production of high molecular weight polybenzimidazole is provided. The process comprises reacting a monomeric reactant or reactants, which are capable of reacting to form a polybenzimidazole, at a temperature above the melting temperature of the monomeric reactant or reactants in the presence of a catalyst selected from the group consisting of organic sulfonic acids, halogenated acetic acids, and non-oxidizing inorganic acids. The polybenzimidazole is preferably produced by the reaction of 3,3',4,4'-tetraaminobiphenyl with isophthalic acid at a temperature within the range of approximately 360° C. to 425° C. for a period of time within the range of approximately 3 to 5 hours in the presence of approximately 0.25 to 0.5 percent by weight, based upon the weight of the isophthalic acid, of p-toluenesulfonic acid. The process of the present invention is conducted in the absence of a solvent, generates only a small amount of foam, and forms water as the sole, readily removable by-product.

48 Claims, No Drawings

4,312,976

SINGLE-STAGE MELT POLYMERIZATION PROCESS FOR THE PRODUCTION OF HIGH MOLECULAR WEIGHT POLYBENZIMIDAZOLE

BACKGROUND OF THE INVENTION

The present invention provides a single-stage melt polymerization process for the production of high molecular weight polybenzimidazole.

One known method of preparing high molecular weight aromatic polybenzimidazoles comprises melt polymerizing an aromatic tetraamine and a diphenyl ester or an anhydride of an aromatic dicarboxylic acid at an elevated temperature and thereafter further polymerizing the product of the melt polymerization in the solid state (see U.S. Re. Pat. No. 26,065). However, according to this process, in order to produce polymers of sufficiently high molecular weight to be suitable for practical use, it is necessary to finely pulverize the product of the melt polymerization prior to polymerization in the solid state and to conduct the solid state polymerization at an elevated temperature under a reduced pressure of less than 0.5 mm. Hg or at an elevated temperature and in an inert gas stream over a prolonged period of time.

Thus, the process disclosed in U.S. Re. Pat. No. 26,065 requires several complicated operations. In addition, since the reaction is conducted over a long period of time at an elevated temperature, it tends to form insoluble and infusible polymers.

One method which has heretofore been proposed to overcome the above-mentioned deficiencies involves the solution polymerization of an inorganic acid salt of an aromatic tetraamine and a dicarboxylic acid or a derivative thereof with heat in polyphosphoric acid (see U.S. Pat. No. 3,313,738). According to this process, the polymer product after completion of the reaction can be separated by pouring the reaction mixture in the form of a polyphosphoric acid solution into a large quantity of water. However, this separation procedure is complicated and, moreover, it is difficult to recover and reuse the polyphosphoric acid. Thus, this process is not generally considered satisfactory for the commercial production of polybenzimidazoles.

Another process for producing polybenzimidazoles is taught in U.S. Pat. No. 3,509,108. In such a process, the monomers are initially reacted in a melt phase polymerization at a temperature above 200° C. and a pressure above 50 p.s.i. The reaction product is then heated in a solid state polymerization at a temperature above 300° C. to yield the final aromatic polybenzimidazole product. The patented process requires that the initial reaction be conducted at a pressure above 50 p.s.i. (preferably, between 300 p.s.i. and 600 p.s.i.) in order to control the foaming encountered during the polymerization.

U.S. Pat. No. 3,551,389 discloses a two-stage process for the production of aromatic polybenzimidazoles. The monomers are heated at a temperature above 170° C. in a first stage melt polymerization zone until a foamed prepolymer is formed. The foamed prepolymer is cooled, pulverized, and introduced into a second stage polymerization zone where it is heated in the presence of phenol to yield a polybenzimidazole polymer product. Like the process of U.S. Re. Pat. No. 26,065, this process involves multiple operations and tends to form insoluble polymers.

U.S. Pat. No. 3,433,772 discloses a two-stage polymerization process for the production of aromatic polybenzimidazoles which utilizes an organic additive, such as an alkane having 11 to 18 carbon atoms or a polycarbocyclic hydrocarbon, in order to control foaming during the first stage.

U.S. Pat. No. 3,655,632 discloses a melt polymerization process for the production of high molecular weight aromatic polybenzimidazoles. The process comprises heating a mixture of an aromatic tetraamine and an aromatic dinitrile in the presence of an ammonium salt of an inorganic acid or an organic sulfonic acid. The patent states, at column 1, lines 27–32, that it is considered generally impossible to obtain aromatic polybenzimidazoles, especially of high molecular weight, by merely heating a mixture of aromatic tetraamines and aromatic dicarboxylic acids or derivatives thereof.

It is therefore an object of the present invention to provide a single-stage melt polymerization process for the production of high molecular weight polybenzimidazole.

It is also an object of the present invention to provide a single-stage melt polymerization process for the production of high molecular weight polybenzimidazole which comprises heating a mixture of at least one aromatic tetraamine and at least one dicarboxylic acid, or an aromatic diaminocarboxylic acid, in the presence of a specified catalyst.

It is also an object of the present invention to provide a single-stage process for the production of high molecular weight polybenzimidazole which is conducted in the absence of a solvent.

It is also an object of the present invention to provide a single-stage melt polymerization process for the production of high molecular weight polybenzimidazole which generates only a small amount of foam.

It is also an object of the present invention to provide a single-stage melt polymerization process for the production of high molecular weight polybenzimidazole which forms water as the sole, readily removable by-product.

It is also an object of the present invention to provide a single-stage melt polymerization process for the production of high molecular weight polybenzimidazole which exhibits good solubility.

It is also an object of the present invention to provide a single-stage melt polymerization process for the production of high molecular weight polybenzimidazole which provides a reduction in cost as compared to other polybenzimidazole polymerization processes.

These and other objects, as well as the scope, nature, and utilization of the process, will be apparent from the following description and the appended claims.

SUMMARY OF THE INVENTION

A single-stage melt polymerization process for the production of high molecular weight polybenzimidazole is provided. The process comprises reacting a member of the class consisting of (A) a mixture of (1) at least one aromatic tetraamine containing two groups of amine substituents, said amine substituents in each group being in an ortho position relative to each other, and (2) at least one dicarboxylic acid, and (B) at least one aromatic compound having a pair of amine substituents in an ortho position relative to each other and a carboxylic acid group positioned upon an aromatic ring at a temperature above the melting temperature of the monomeric reactant or reactants in the presence of a catalyst selected from the group consisting of organic sulfonic acids, halogenated acetic acids, and non-oxidizing inorganic acids.

DETAILED DESCRIPTION OF THE INVENTION

The present invention provides a single-step melt polymerization process for the production of high molecular weight polybenzimidazole in the presence of a specified catalyst.

Polybenzimidazoles are a known class of heterocyclic polymers which consist essentially of recurring units of the following Formulas I and II. Formula I is:

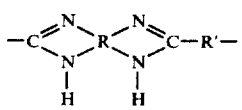

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran.

Formula II is:

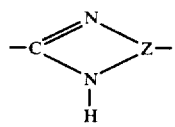

wherein Z is an aromatic nucleus having the nitrogen atoms forming the benzimidazole ring paired upon adjacent carbon atoms of the aromatic nucleus.

Any of the above polybenzimidazoles represented by the Formulas I and II can be prepared by the process of the present invention.

The following generalized equation illustrates the condensation reaction which occurs in forming the polybenzimidazoles having the recurring units of Formula I:

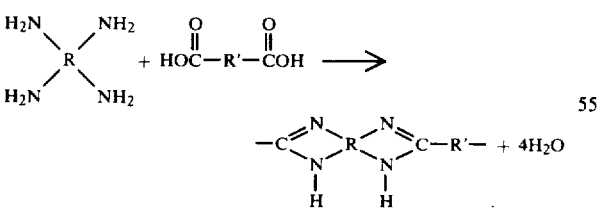

Such polybenzimidazoles are produced by the reaction of a mixture of (1) at least one aromatic tetraamine containing two groups of amine substituents, the amine substituents in each group being in an ortho position relative to each other, and (2) at least one dicarboxylic acid.

It is advantageous to use as the aromatic tetraamines compounds such as those illustrated below:

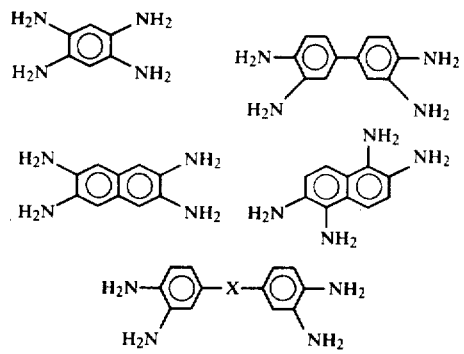

where X represents —O—, —S—, —SO$_2$—,

or a lower alkyl group, such as —CH$_2$—, —(CH$_2$)$_2$—, or —C(CH$_3$)$_2$—. Among such aromatic tetraamines may be mentioned, for example, 1,2,4,5-tetraaminobenzene; 1,2,5,6-tetraaminonaphthalene; 2,3,6,7-tetraaminonaphthalene; 3,3',4,4'-tetraaminodiphenyl ether; 3,3',4,4'-tetraaminobiphenyl; 3,3'4,4'-tetraaminodiphenyl methane; 3,3'4,4'-tetraaminodiphenyl ethane; 3,3',4,4'-tetraminodiphenyl-2,2-propane; 3,3'4,4'-tetraaminodiphenyl thioether; and 3,3'4,4'-tetraaminodiphenyl sulfone. The preferred aromatic tetraamine is 3,3'4,4'-tetraaminobiphenyl.

The dicarboxylic acids which are suitable for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxyl groups are substituents upon carbon atoms in a ring compound such as pyridine, pyrazine, furan, quinoline, thiophene, and pyran.

The preferred dicarboxylic acids are aromatic dicarboxylic acids such as those illustrated below:

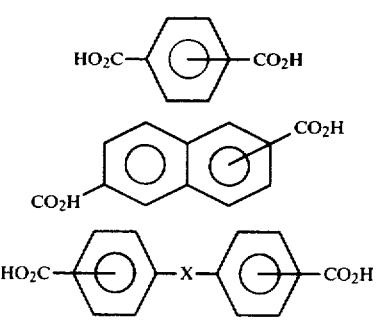

where X is as defined above. For example, the following diacids can suitably be employed: terephthalic acid; isophthalic acid; 4,4'-biphenyldicarboxylic acid; 1,4-naphthalenedicarboxylic acid; 1,6-naphthalenedicarboxylic acid; 2,6-naphthalenedicarboxylic acid; 4,4'-diphenyletherdicarboxylic acid; 4,4'-diphenylmethandicarboxylic acid; 4,4'-diphenylsulfonedicarboxylic acid; and 4,4'-diphenylthioetherdicarboxylic acid. Isophthalic acid is the dicarboxylic acid which is most preferred for use in the process of the present invention.

It is preferred to employ the dicarboxylic acid in a ratio of about 1 mole per mole of aromatic tetraamine. However, in order to obtain a product having an optimum molecular weight, it may be desirable to employ an excess of approximately 0.25 molecular percent of the dicarboxylic acid over the tetraamine, or vice versa. The optimal ratio of reactants in a particular polymerization system can be easily determined by one of ordinary skill in the art.

Examples of polybenzimidazoles which have the recurring structure of Formula I and which may be prepared according to the process of the present invention include:

poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene-4"4"')-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5',5"-di(benzimidazole)-propane-2,2; and
poly-2,2'-(m-phenylene)-5',5"-di(benzimidazole)ethylene-1,2 where the double bonds of the ethylene groups are intact in the final polymer.

The preferred polybenzimidazole of Formula I prepared by the process of the present invention is poly-2,2'-(m-phenylene)-5,5'-bibenzimidazole, the recurring unit of which is:

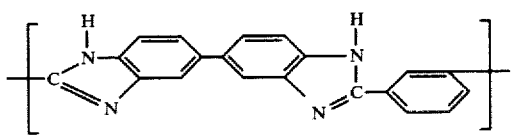

This polymer can be prepared in accordance with the process of the present invention by the reaction of 3,3',4,4'-tetraaminobiphenyl with isophthalic acid.

The polybenzimidazoles having the recurring units of Formula II can be prepared by the autocondensation of at least one aromatic compound having a pair of amine substituents in an ortho position relative to each other and a carboxylic acid group positioned upon an aromatic nucleus (referred to hereinafter as the diaminocarboxylic acid reactant). Examples of such compounds include 3,4-diaminobenzoic acid; 5,6-diaminonaphthalene-1-carboxylic acid; 5,6-diaminonaphthalene-2-carboxylic acid; 6,7-diaminonaphthalene-1-carboxylic acid; 6,7-diaminonaphthalene-2-carboxylic acid, etc. A preferred example of such a compound is 4-carboxy-3',4'-diaminodiphenyl ether, the structural formula of which is

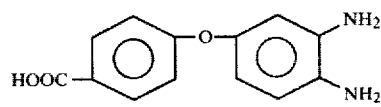

According to the process of the present invention, high molecular weight polybenzimidazole is produced by reacting the monomeric reactant or reactants described above. The preferred reactants are a mixture of at least one aromatic tetraamine and at least one dicarboxylic acid, as defined above, with 3,3'4,4'-tetraaminobiphenyl and isophthalic acid being especially preferred. The monomeric reactant or reactants are reacted at a temperature above the melting temperature of the monomeric reactant or reactants. When a mixture of at least one aromatic tetraamine and at least one dicarboxylic acid (as defined above) is employed, the melting temperature of the mixture is commonly the melting point of the dicarboxylic acid.

The melt polymerization process of the present invention is commonly conducted at a temperature of at least approximately 340° C., and, preferably, at a temperature within the range of approximately 340° C. to 450° C. In an especially preferred embodiment, the process of the present invention is conducted at a temperature within the range of approximately 360° C. to 425° C. (e.g., 425° C.)

The process of the present invention preferably employs a pressure equal to at least atmospheric pressure, e.g., one to two atmospheres, and preferably atmospheric pressure. Such a pressure is commonly obtained by employing an open polymerization system provided with a distillation column in order to remove the H₂O which is produced as a by-product of the reaction.

In the case of autocondensation reactions employing a diaminocarboxylic acid reactant (as defined above), it may be desirable to employ pressures slightly above atmospheric pressure (e.g., up to approximately 2 atmospheres). The higher pressures are utilized to present sublimation of diaminocarboxylic acid reactant. One method of obtaining the higher pressures is to allow the H₂O produced during the reaction to accumulate in the reaction system until the desired pressure is attained.

The reaction is conducted in a substantially oxygen-free atmosphere. For example, an inert gas such as nitrogen or argon can be continuously passed through the reaction zone during the polymerization. The inert gas employed should be substantially oxygen-free, i.e., contain less than about 20 p.p.m. of oxygen, preferably less than about 8 p.p.m., and more preferably, be oxygen-free. The inert gas is introduced into the reaction zone at a rate of flow measured at standard conditions, that is, atmospheric pressure and temperature, within the range of about 1 to 200 percent of the volume of the reaction zone per minute. The inert gas can be passed into the polymerization reaction zone at room temperature or, if desired, preheated to the reaction temperature.

The melt polymerization process of the present invention is conducted for a period of time sufficient to produce a high molecular weight polybenzimidazole product. The inherent viscosity of the polybenzimidazole product is an indication of its molecular weight. The high molecular weight polybenzimidazoles produced by the process of the present invention exhibit an inherent viscosity of at least approximately 0.5 dl./g. when measured at a concentration of 0.4 g. of the polymer in 100 ml. of 97 percent $H_2SO_4$ at 25° C. Preferably, the polymer exhibits an inherent viscosity of at least approximately 0.6 dl./g., and the inherent viscosity is most preferably within the range of approximately 0.7 to 0.75 dl./g. In order to obtain a high molecular weight polybenzimidazole product, the reaction is commonly conducted for a period of time of at least approximately 3 hours. The reaction is preferably conducted for a period of time within the range of approximately 3 to 10 hours, e.g., approximately 3 to 5 hours.

The monomeric reactant or reactants can be heated to the polymerization temperature either by a single heating or by a step-wise heating process. Especially at the high polymerization temperatures, it is sometimes desirable to employ a step-wise heating process in order to minimize the possibility of monomer decomposition. For example, the monomeric reactant or reactants can be heated initially to a temperature slightly greater than the melting temperature of the reaction mixture. The temperature of the reaction mixture can then be raised at intervals within the range of approximately 20° C. to 50° C. until the desired polymerization temperature and degree of polymerization are attained. The reaction mixture can be held at each temperature of the step-wise procedure for a period of time within the range of approximately 1 to 3 hours, e.g., approximately one and one-half hours.

The melt polymerization process of the present invention employs a catalyst selected from the group consisting of organic sulfonic acids, halogenated acetic acids, and non-oxidizing inorganic acids. Among the organic sulfonic acids can be listed such compounds as p-toluenesulfonic acid, benzenesulfonic acid, methanesulfonic acid, trifluoromethanesulfonic acid, and mixtures of the above, among others. The halogenated acetic acids include such compounds as trifluoroacetic acid, trichloroacetic acid, mixtures of the above, etc. The inorganic acids which are non-oxidizing in the context of the present invention include such acids as sulfuric acid, phosphoric acid, and hydrochloric acid. Nitric acid is not a suitable inorganic acid because of its strong oxidizing capabilities. Additional catalysts which may be suitable for use in the process of the present invention include organic complexes of tin and titanium. The catalyst which is preferred for use in the process of the present invention is p-toluenesulfonic acid.

In the case of a melt polymerization employing a mixture of at least one tetraamine and at least one dicarboxylic acid as reactants, the catalyst is present in an amount within the range of approximately 0.01 to 2 percent by weight, based upon the weight of the dicarboxylic acid reactant. The catalyst is preferably present in an amount within the range of approximately 0.25 to 0.5 percent by weight, and, most preferably, in an amount of approximately 0.5 percent by weight. In the case of the melt polymerization of an aromatic diaminocarboxylic acid, the catalyst is present in an amount within the range of approximately 0.01 to 2 percent by weight, based upon the total weight of monomer present in the system. In such a system, the catalyst is preferably present in an amount within the range of 0.25 to 0.5 percent by weight, and more preferably in an amount of approximately 0.5 percent by weight.

The process of the present invention provides numerous advantages over prior art processes for the production of high molecular weight polybenzimidazoles. The process of the present invention is a single-stage, melt polymerization process which is conducted in the absence of a solvent. The polybenzimidazoles produced by the process of the present invention have a high molecular weight as indicated by inherent viscosity measurements. The high molecular weight polybenzimidazoles can be produced by the process of the present invention by merely heating a mixture of at least one aromatic tetraamine and at least one dicarboxylic acid, or an aromatic diaminocarboxylic acid, in the presence of a specified catalyst, which has heretofore been thought not to be possible. Moreover, the process of the present invention provides a process for the production of high molecular weight polybenzimidazoles which generates only a small amount of foam, thereby alleviating the need for an antifoaming additive. Furthermore, the only by-product formed by the process of the present invention is water, which can be removed readily from the reaction system.

Because the process of the present invention is a single-stage process conducted under an inert atmosphere, contact of the polybenzimidazole with oxygen during the polymerization process is avoided. Two-stage processes which involve pulverizing the polymer in air prior to a solid state polymerization do not avoid contacting the polybenzimidazole with oxygen. Such contact is known to have an adverse effect on the solubility of the polymer. However, prior art processes have had to sacrifice a certain degree of solubility of the polymer product in order to obtain the high molecular weights desired by solid state polymerization. By avoiding contact with air during the polymerization, the process of the present invention provides high molecular weight polybenzimidazole which also exhibits good solubility.

The polybenzimidazoles produced by the process of the present invention exhibit high heat stability and can be employed in the production of various formed articles, such as fibers, films, and other materials having a wide field of application.

The following Examples are given as specific illustrations of the invention. It should be understood, however, that the invention is not limited to the specific details set forth in the Examples.

EXAMPLE 1

Into a 3-necked flask equipped with a nitrogen inlet and outlet, mechanical stirrer, and a condenser were placed 28.175 g. (0.1315 moles) of 3,3',4,4'-tetraaminobiphenyl, 21.846 g. (0.1315 moles) of isophthalic acid, and 0.1 g. of p-toluenesulfonic acid monohydrate. The flask was degassed for one hour and then filled with nitrogen. The mixture was heated rapidly with stirring for a period of approximately one hour to a temperature above the melting temperature of the mixture; i.e., to a temperature above approximately 340° C. By this point, 4 ml. of water had been collected. The temperature of the reaction mixture was then raised during the next hour to 360° C. and held at that temperature for the next 3 hours. The resulting product was cooled to room temperature to obtain a quantitative yield of the polybenzimidazole. The polybenzimidazole exhibited an inherent viscosity of 0.6 dl./g. when measured in a concentration of 0.4 g. of the polybenzimidazole in 100 ml. of 97 percent sulfuric acid.

EXAMPLE 2

The polybenzimidazole of Example 1 was prepared according to the procedure described in Example 1 except that, after heating the reaction mixture to the melting temperature of the mixture, the polymerization temperature was raised to 400° C. and held at that temperature for 3 hours. The inherent viscosity of the polybenzimidazole thus produced was 0.59 dl./g. when measured in a concentration of 0.4 g. of the polybenzimidazole in 100 ml. of 97 percent sulfuric acid at 25° C.

Although the invention has been described with preferred embodiments, it is to be understood that variations and modifications may be employed as will be apparent to those skilled in the art. Such variations and modifications are to be considered within the purview and scope of the claims appended hereto.

I claim:

1. A single-stage melt polymerization process for the production of high molecular weight polybenzimidazole which comprises reacting a member of the class consisting of:
   (A) a mixture of (1) at least one aromatic tetraamine containing two groups of amine substituents, said amine substituents in each group being in an ortho position relative to each other, and (2) at least one dicarboxylic acid, and
   (B) at least one aromatic compound having a pair of amine substituents in an ortho position relative to each other and a carboxylic acid group positioned upon an aromatic nucleus
at a temperature above the melting temperature of the monomeric reactant or reactants in the presence of a catalyst selected from the group consisting of organic sulfonic acids, halogenated acetic acids, and non-oxidizing inorganic acids.

2. The process of claim 1 wherein said high molecular weight polybenzimidazole exhibits an inherent viscosity of at least approximately 0.5 dl./g. when measured at a concentration of 0.4 g. of said polybenzimidazole in 100 ml. of 97 percent sulfuric acid at 25° C.

3. The process of claim 1 wherein said high molecular weight polybenzimidazole is produced by the reaction of a mixture of (1) at least one aromatic tetraamine containing two groups of amine substituents, said amine substituents in each group being in an ortho position relative to each other, and (2) at least one dicarboxylic acid.

4. The process of claim 1 wherein said high molecular weight polybenzimidazole is produced by the reaction of at least one aromatic compound having a pair of amine substituents in an ortho position relative to each other and a carboxylic acid group positioned upon an aromatic nucleus.

5. The process of claim 4 wherein said aromatic compound comprises 4-carboxy-3',4'-diaminodiphenyl ether.

6. The process of claim 1 wherein said melt polymerization process is conducted at a temperature of at least approximately 340° C.

7. The process of claim 1 wherein said melt polymerization process is conducted for a period of time of at least approximately 3 hours.

8. The process of claim 1 wherein said melt polymerization process is conducted under an inert atmosphere.

9. The process of claim 1 wherein said catalyst is an organic sulfonic acid selected from the group consisting of p-toluenesulfonic acid, benzenesulfonic acid, methanesulfonic acid, trifluoromethanesulfonic acid, and mixtures thereof.

10. The process of claim 9 wherein said catalyst is p-toluenesulfonic acid.

11. The process of claim 1 wherein said catalyst is a halogenated acetic acid selected from the group consisting of trifluoroacetic acid, trichloroacetic acid, and mixtures thereof.

12. The process of claim 1 wherein said catalyst is a non-oxidizing inorganic acid selected from the group consisting of sulfuric acid, phosphoric acid, and hydrochloric acid.

13. The process of claim 3 wherein said catalyst is present in an amount within the range of approximately 0.01 to 2 percent by weight, based upon the weight of said dicarboxylic acid.

14. The process of claim 5 wherein said catalyst is present in an amount within the range of approximately 0.01 to 2 percent by weight, based upon the weight of said aromatic compound.

15. A single-stage melt polymerization process for the production of high molecular weight aromatic polybenzimidazole which comprises reacting a mixture of (1) at least one aromatic tetraamine containing two groups of amine substituents, said amine substituents in each group being in an ortho position relative to each other, and (2) at least one dicarboxylic acid at a temperature above the melting point of said dicarboxylic acid in the presence of a catalyst selected from the group consisting of organic sulfonic acids, halogenated acetic acids, and non-oxidizing inorganic acids.

16. The process of claim 15 wherein said high molecular weight aromatic polybenzimidazole exhibits an inherent viscosity of at least approximately 0.5 dl./g. when measured at a concentration of 0.4 g. of said polybenzimidazole in 100 ml. of 97 percent sulfuric acid at 25° C.

17. The process of claim 15 wherein said aromatic tetraamine comprises 3,3',4,4'-tetraaminobiphenyl.

18. The process of claim 15 wherein said dicarboxylic acid is selected from the group consisting of aromatic dicarboxylic acids; aliphatic dicarboxylic acids; and heterocyclic dicarboxylic acids wherein the carboxyl groups are substituents upon carbon atoms in a ring compound selected from the group consisting of pyridine, pyrazine, furan, quinoline, thiophene, and pyran.

19. The process of claim 18 wherein said dicarboxylic acid comprises an aromatic dicarboxylic acid.

20. The process of claim 19 wherein said dicarboxylic acid comprises isophthalic acid.

21. The process of claim 15 wherein said melt polymerization process is conducted at a temperature of at least approximately 340° C.

22. The process of claim 15 wherein said melt polymerization process is conducted for a period of time of at least approximately 3 hours.

23. The process of claim 15 wherein said melt polymerization process is conducted at atmospheric pressure.

24. The process of claim 15 wherein said melt polymerization process is conducted under an inert atmosphere.

25. The process of claim 15 wherein said catalyst is an organic sulfonic acid selected from the group consisting of p-toluenesulfonic acid, benzenesulfonic acid, methanesulfonic acid, trifluoromethanesulfonic acid, and mixtures thereof.

26. The process of claim 25 wherein said catalyst is p-toluenesulfonic acid.

27. The process of claim 15 wherein said catalyst is a halogenated acetic acid selected from the group consisting of trifluoroacetic acid, trichloroacetic acid, and mixtures thereof.

28. The process of claim 15 wherein said catalyst is a non-oxidizing inorganic acid selected from the group consisting of sulfuric acid, phosphoric acid, and hydrochloric acid.

29. The process of claim 15 wherein said catalyst is present in an amount within the range of approximately 0.01 to 2 percent by weight, based upon the weight of said dicarboxylic acid.

30. A single-stage melt polymerization process for the production of high molecular weight aromatic polybenzimidazole having an inherent viscosity of at least approximately 0.5 dl./g. when measured at a concentration of 0.4 g. of said polybenzimidazole in 100 ml. of 97 percent sulfuric acid at 25° C., said process comprising reacting a mixture of (1) at least one aromatic tetraamine containing two groups of amine substituents, said amine substituents in each group being in ortho position relative to each other, and (2) at least one aromatic dicarboxylic acid at a temperature of at least approximately 340° C. for a period of time of at least approximately 3 hours in the presence of p-toluenesulfonic acid.

31. The process of claim 30 wherein said high molecular weight aromatic polybenzimidazole exhibits an inherent viscosity of at least approximately 0.6 dl./g. when measured at a concentration of 0.4 g. of said polybenzimidazole in 100 ml. of 97 percent sulfuric acid.

32. The process of claim 31 wherein said high molecular weight aromatic polybenzimidazole exhibits an inherent viscosity within the range of approximately 0.7 to 0.75 dl./g. when measured at a concentration of 0.4 g. of said polybenzimidazole in 100 ml. of 97 percent sulfuric acid.

33. The process of claim 30 wherein said aromatic tetraamine comprises 3,3+,4,4'-tetraaminobiphenyl.

34. The process of claim 30 wherein said aromatic dicarboxyli acid and comprises isophthalic acid.

35. The process of claim 30 wherein said melt polymerization is conducted at a temperature within the range of approximately 340° C. to 450° C.

36. The process of claim 35 wherein said melt polymerization process is conducted at a temperature within the range of approximately 360° C. to 425° C.

37. The process of claim 36 wherein said melt polymerization process is conducted at a temperature of approximately 425° C.

38. The process of claim 30 wherein said melt polymerization process is conducted for an period of time within the range of approximately 3 to 10 hours.

39. The process of claim 38 wherein said melt polymerization process is conducted for a period of time within the range of approximately 3 to 5 hours.

40. The process of claim 30 wherein said melt polymerization process is conducted at atmospheric pressure.

41. The process of claim 30 wherein said melt polymerization process is conducted under an inert atmosphere.

42. The process of claim 30 wherein said p-toluenesulfonic acid is present in an amount within the range of approximately 0.01 to 2 percent by weight, based upon the weight of said aromatic dicarboxylic acid.

43. The process of claim 26 wherein said p-toluenesulfonic acid is present in an amount within the range of approximately 0.25 to 0.5 percent by weight, based upon the weight of said aromatic dicarboxylic acid.

44. A single-stage melt polymerization process for the production of a high molecular weight aromatic polybenzimidazole having an inherent viscosity of at least approximately 0.5 dl./g. when measured at a concentration of 0.4 g. of said polybenzimidazole in 100 ml. of 97 percent sulfuric acid, said process comprising reacting under an inert atmosphere 3,3',4,4'-tetraaminobiphenyl and isophthalic acid at a temperature within the range of approximately 360° C. to 425° C. for a period of time within the range of approximately 3 to 5 hours in the presence of approximately 0.25 to 0.5 percent by weight, based upon the weight of said isophthalic acid, of p-toluenesulfonic acid.

45. The process of claim 44 wherein said high molecular weight aromatic polybenzimidazole exhibits an inherent viscosity of at least approximately 0.6 dl./g. when measured at a concentration of 0.4 g. of said polybenzimidazole in 100 ml. of 97 percent sulfuric acid.

46. The process of claim 45 wherein said high molecular weight aromatic polybenzimidazole exhibits an inherent viscosity within the range of approximately 0.7 to 0.75 dl./g. when measured at a concentration of 0.4 g. of said polybenzimidazole in 100 ml. of 97 percent sulfuric acid.

47. The process of claim 44 wherein said melt polymerization process is conducted at a temperature of approximately 425° C.

48. The process of claim 44 wherein said melt polymerization process is conducted at atmospheric pressure.

* * * * *